Nov. 10, 1931.  J. M. LINDGREN  1,831,674

PACKING FOR CONNECTING RODS, PUMP SHAFTS, AND THE LIKE

Filed May 20, 1929

INVENTOR
JOHN M. LINDGREN
BY Lester L. Sargent
ATTORNEY

Patented Nov. 10, 1931

1,831,674

UNITED STATES PATENT OFFICE

JOHN MAURICE LINDGREN, OF SAN PEDRO, CALIFORNIA

PACKING FOR CONNECTING RODS, PUMP SHAFTS, AND THE LIKE

Application filed May 20, 1929. Serial No. 364,626.

The object of my invention is to provide a novel and efficient packing for connecting rods, pump shafts, and other mechanical devices where packing is required; to provide a metal packing of this type and to provide novel means for lubricating the rod to which the packing is applied.

I attain these and other objects of my invention by the means illustrated in the accompanying drawings, in which,—

Like characters of reference designate like parts in each of the several views.

Figure 1:
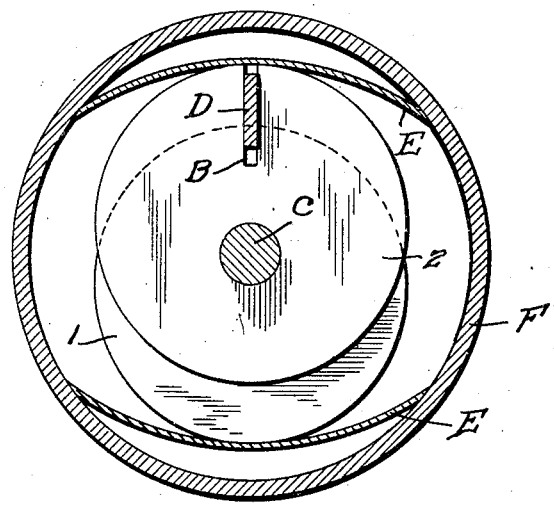
Figure 1 is a transverse section through my invention.
Figure 3:
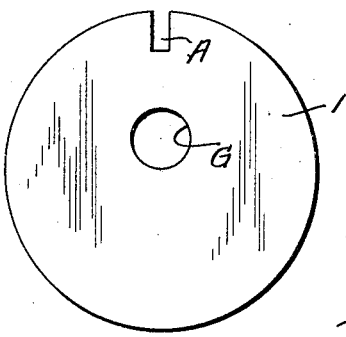
Fig. 3 is a detail view of one of the plates 1.
Figure 4:
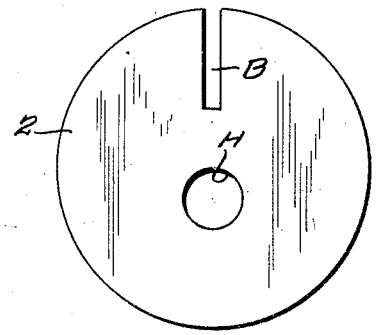
Fig. 4 is a detail view of one of the plates 2.
Figure 2:
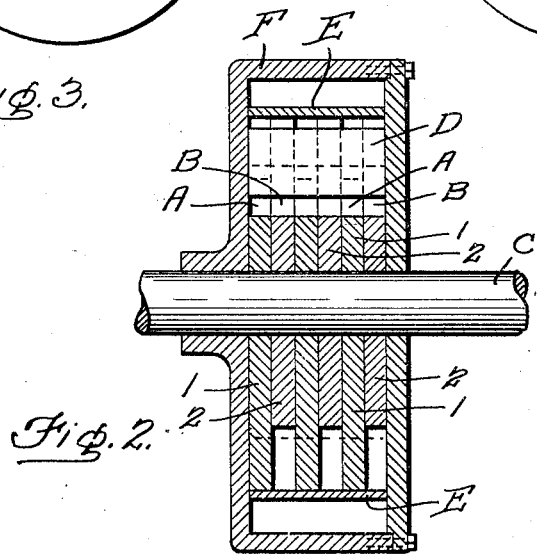
Fig. 2 is a longitudinal section through my invention.

Referring to the accompanying drawings, 1 designates the connecting rod, pump shaft or other rod on which the packing is mounted, and F represents the casing within which the packing is contained. The packing consists of a plurality of discs 1 and 2, the disc 1 having a short slot A and an offset aperture G at a pre-determined distance from the end of slot A offset from the center of the disc. I provide a disc 2 having a relatively long slot B, the disc also having an aperture H at a pre-determined distance from the end of slot B corresponding with the distance of the aperture A in disc 1. The aperture H also is offset from the center of the disc 2. I provide suitable dowel strips D to seat in the slots A and B of the discs 1 and 2 as shown in Figs. 1 and 2. I also provide suitable springs E for holding the disc in proper operative position within the casing F, as shown in Figs. 1 and 2. While a flat spring is illustrated in the drawings, it is within the contemplation of my invention to substitute a suitable coil spring having a like function.

As the discs 1 and 2 have their apertures G and H mounted in positions offset from the center, these discs are mounted in a staggered relation on the rod C, as shown in Figs. 1 and 2, and are retained in said relation by the dowel strips D which seat in the respective slots A and B and are retained in these slots by the springs E.

The discs being preferably metal will resits heat better than fiber packing. As I provide spaces between the discs, as shown in Fig. 2 provision is thus made for holding oil or other lubricant for lubricating the connecting rod or shaft C.

What I claim is:

1. In packing for connecting rods, pump shafts and the like, the combination of a rod, a plurality of metal discs mounted on the rod, each of said discs having a slot extending inwardly from the periphery of the discs, the slots of part of the discs being of different length than the slots of the other discs, all the discs having an aperture positioned a like distance from the inner end of its slot and offset from the center of the discs, whereby alternate discs when mounted on the rod have their peripheral portions disposed in a staggered relation, dowel strips extending transversely of the discs and seating in the aforesaid slots, springs adapted for holding the discs in proper operative positions, and a casing in which the aforesaid discs and springs are mounted.

2. In packing for connecting rods, pump shafts and the like, the combination of a rod, a plurality of discs mounted on the rod, each of said discs having a slot extending inwardly from the periphery of the disc, the slots of part of the discs being of different length than the slots of the other discs, the discs having apertures to receive the rod, said apertures being spaced a like distance from the ends of the slot in each disc and offset from the center of the discs, whereby alternate discs have their peripheral portions disposed in a staggered relation, oppositely positioned springs bearing resiliently on opposite peripheral portions of the discs, and a casing in which the aforesaid discs and springs are mounted, said casing being adapted to contain a suitable lubricant.

3. In packing for connecting rods, pump shafts and the like, the combination of a rod, a plurality of metal discs mounted on the rod, the discs having slots of different lengths, alternate discs having their peripheral portions aligned at one side of the rod and intervening discs having their peripheral portions aligned on the opposite side of the rod, the discs being maintained in a staggered relation, springs bearing on opposite peripheral portions of the discs and a casing containing said discs and springs.

4. In packing for connecting rods, pump shafts and the like, the combination of a rod, a plurality of metal discs, the discs having slots extending inwardly from the peripheries of the discs, the slots of alternate discs being of like length but of different length from the slots of adjacent discs, alternate discs having their peripheral portions aligned on opposite sides of the rod, opposite springs bearing on opposite peripheral portions of the discs, and a casing in which the aforesaid mechanism is mounted.

5. In packing for connecting rods, pump shafts and the like, the combination of a rod, a plurality of discs, the discs having apertures to receive the rod and offset relative to the center of the discs, alternate discs having their peripheral portions aligned at one side of the rod and intervening discs having their offset peripheral portions aligned on the opposite side of the rod to maintain the discs in a continuously staggered relation, bowed springs resiliently engaging the peripheries of the discs, and a casing in which the discs and springs are mounted.

JOHN MAURICE LINDGREN.